Aug. 10, 1965   D. R. JESSE ETAL   3,199,215
CASCADE DRIER FOR DEWATERING AND DRYING PELLET-WATER SLURRIES
Filed Oct. 4, 1961
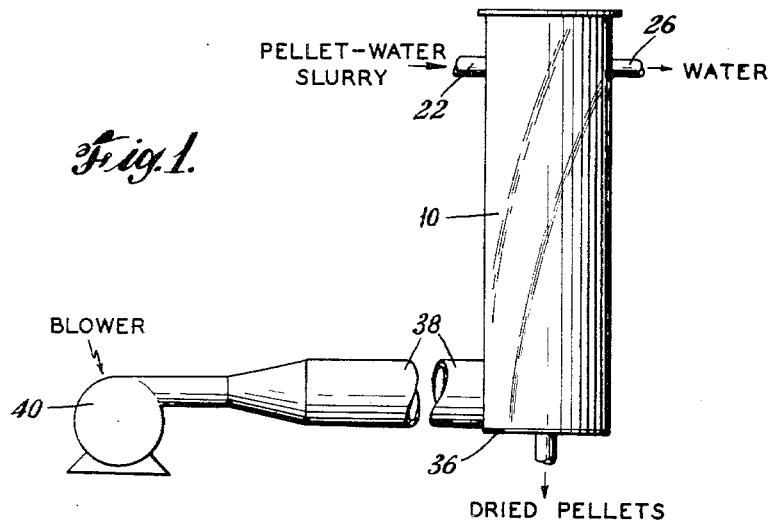
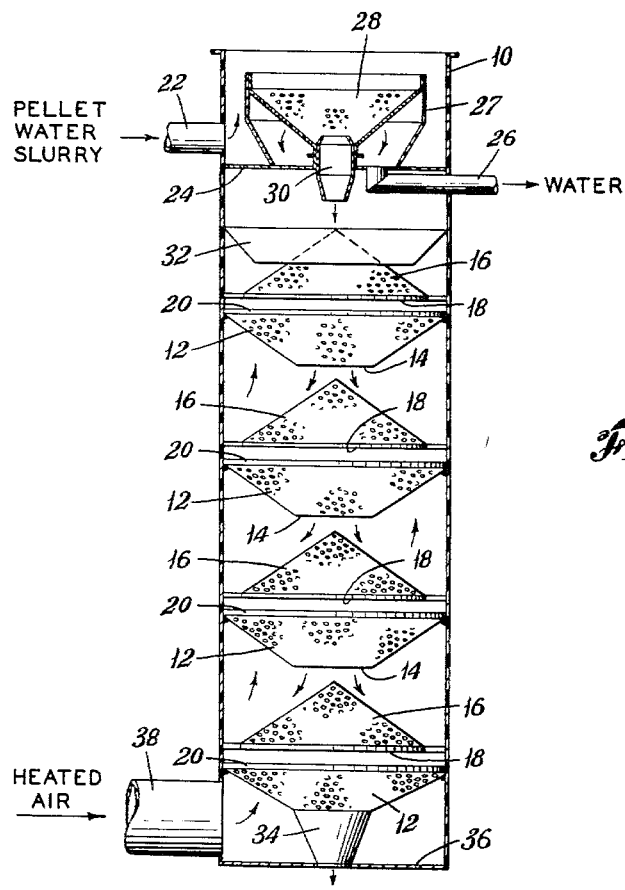
INVENTORS
DALE R. JESSE
WILLIAM G. CROCKER
BY Richard S. Shrens
ATTORNEY 3,199,215
CASCADE DRIER FOR DEWATERING AND
DRYING PELLET-WATER SLURRIES
Dale R. Jesse, Monterey Park, Calif., and William G. Crocker, Odessa, Tex., assignors to Union Carbide Corporation, a corporation of New York
Filed Oct. 4, 1961, Ser. No. 142,942
4 Claims. (Cl. 34—69)

This invention relates to cascade driers and more particularly for dewatering and drying of pellet-water slurries of such thermoplastic pellets.

Shaker driers have had maintenance problems of failure of bearings, shaker baskets split due to metal fatigue, and have disadvantages of ineffective drying, lack of cleanliness and noisy operation.

The main objects of the present invention are to avoid these difficulties, and to simplify and improve the construction and operation of driers for pellet water slurries.

According to the present invention, a shell is provided with a series of sets of screens each comprising a lower screen secured to the inside of the shell and inclined downwardly to a discharge orifice, and an upper screen thereabove and inclined in the opposite direction to an orifice discharging onto the upper portion of the lower screen. Preferably, the screens are conical, the discharge orifice from the lower screen is central, and the discharge orifice from the upper screen is annular. Each upper screen comprises a cone having its apex at the top and extending continuously outward from said apex to completely underlie the discharge orifice thereabove. The angle of the screens is preferably 31° to 35° gradated from the bottom to the top. The top portion of the shell is preferably provided with a dewatering section.

In the drawings:

FIG. 1 is an elevation of the cascade drier according to the present invention; and FIG. 2 is an enlarged vertical and cross section through the cascade drier shown in FIG. 1.

In the form shown, the cascade drier comprises a column having a vertical confining shell 10, preferably a hollow plastic cylinder, for example, a two-foot diameter six-feet long and quarter inch thick, desirably transparent.

Mounted at vertically spaced intervals in the column are a series of sets of inclined screens of mesh or perforated plates, each comprising a lower screen 12 secured to the inside of the wall 10 and inclined downwardly to a discharge aperture 14. Each set also comprises an upper screen 16 spaced above the screen 12 and inclined downwardly to a discharge aperture 18.

In the form shown, both screens 12 and 16 are conical, and preferably of 8 to 12 inch mesh stainless steel wire. The rim of the lower screen 12 is preferably secured to a ring 20 of ⅜ inch stainless steel rod, in turn secured to the inside of the shell 10. The upper screen 16 has its apex at the top, and has a rim supported above the ring 20 and of smaller diameter so that the discharge aperture 18 is an annulus between the rim of the cone 16 and the wall 10.

The angle of the screen varies from 31° to 35° in order to compensate for the slower movement of the wetter pellets. Accordingly, the gradation is from the bottom to the top. The screen spacing is from 1½ to 2½ inches, the annulus area is 3 inches wide, and the area of cone discharge is 10% of the column cross section. The column cross section is 1.25 sq. ft./1000 lbs./hr. with an air volume of 470 c.f.m.

The upper portion of the column 10 has a transverse partition 24 providing a dewatering section with a pellet water slurry inlet 22 above the partition and a water outlet 26 therebelow. The dewatering section has an annular cup 27 containing a screen cone 28 having a central discharge chute 30. A conical baffle 32 is interposed between the partition 24 and the first screen 16.

The lower portion of the column has a central discharge chute 34 passing through the bottom 36, and a heated air inlet 38 from a blower 40 passes the heated air to the space within the wall 10 surrounding the chute 36.

In operation, the pellet-water slurry passes through the inlet 22 and fills the space outside the cup 27. Much of the water drains out through the outlet 26. The accumulated dewatered pellets overflow the rim of the cup 27 onto the screen 28 and slide down through the chute 30 onto the center of the top of the screen 16. The baffle 32 prevents the outermost pellets from by-passing the screen 16.

On the top screen 16 the pellets slide outwardly and drop through the annulus 18 onto the lower screen 12, down which they slide inwardly to drop through the discharge orifice 14. The orifice 14 delivers the descending pellets onto the top of the next top screen 16 to repeat the operation in the next set.

From the last bottom screen 12 the dried pellets pass through the cute 34 for packaging.

The heated air from the inlet 38 passes through the lower screen 12, drying the pellets thereon, and on upward with some inward direction to the underside of screen 16, although a permissible amount passes through the annulus 18 counterflow to the descending pellets thereon. Then the heated air passes through the next lower screen 12, the securing to the rod 20 preventing any outer channeling, although a permissible amount of the heated air passes up through the discharge orifice 14 counterflow to the descending pellets therein.

The operation is repeated in the next set of screens, until the heated air finally passes up through the chute 30 counterflow to the descending pellets therein, for discharge to the atmosphere.

What is claimed is:

1. Cascade drier for pellets comprising a shell having a dewatering section in the upper portion thereof, means for supplying pellet water slurry to said dewatering section, means for supplying heated air to the lower portion of said shell, and a series of sets of inclined screens interposed between said dewatering section and the lower portion of said shell, said dewatering section having an annular cup of smaller diameter than said shell, said cup comprising a rim at least a portion of which is spaced inwardly of said shell, an inverted frusto-conical dewatering screen having a discharge outlet for pellets in its lower portion, said screen being mounted in said cup and secured along its upper periphery to said cup about the inner wall thereof, and a water outlet connected to said cup, whereby much of the water is drained from the pellets and the accumulated pellets in said slurry overflow the rim of said cup onto said dewatering screen and are discharged onto said series of sets of inclined screens for cascade drying treatment.

2. Cascade drier as claimed in claim 1, in which sets of screens each comprise an upper cone-shaped screen having its apex at the top and a lower inverted frusto-conical screen which is secured to the side of said shell and inclined downwardly to a central discharge orifice, said upper screen extending outward from said apex to completely underlie the discharge orifice of the screen thereabove.

3. Cascade drier as claimed in claim 1, in which the angle of said screens of said series is gradated from the bottom to the top to compensate for the slower movement of the wetter pellets.

4. Cascade drier as claimed in claim 1 in which all of said screens are conical, the angle of said screens of said series varies from 31° to 35° gradated from the bottom to the top and the area of cone discharge is of the order of 10 percent of the internal cross section of the shell.

References Cited by the Examiner

UNITED STATES PATENTS

| | | | |
|---|---|---|---|
| 334,987 | 1/86 | Shedd | 34—171 |
| 335,366 | 2/86 | Lee | 210—456 |
| 1,115,402 | 10/15 | Bornmann | 34—171 |
| 1,207,763 | 12/16 | Jaeger | 34—171 |
| 1,679,099 | 7/28 | Smith | 34—171 X |
| 1,782,244 | 11/30 | Nagel | 34—171 |
| 2,178,750 | 11/39 | Garland | 34—171 X |
| 2,598,199 | 5/52 | Vissac | 34—171 X |
| 2,780,310 | 2/57 | Schaub | 34—171 |

NORMAN YUDKOFF, *Primary Examiner.*

CHARLES O'CONNELL, *Examiner.*